J. T. BLAKEMAN.
STEAM GENERATOR
APPLICATION FILED APR. 10, 1920.
1,398,582.
Patented Nov. 29, 1921.
3 SHEETS—SHEET 1.
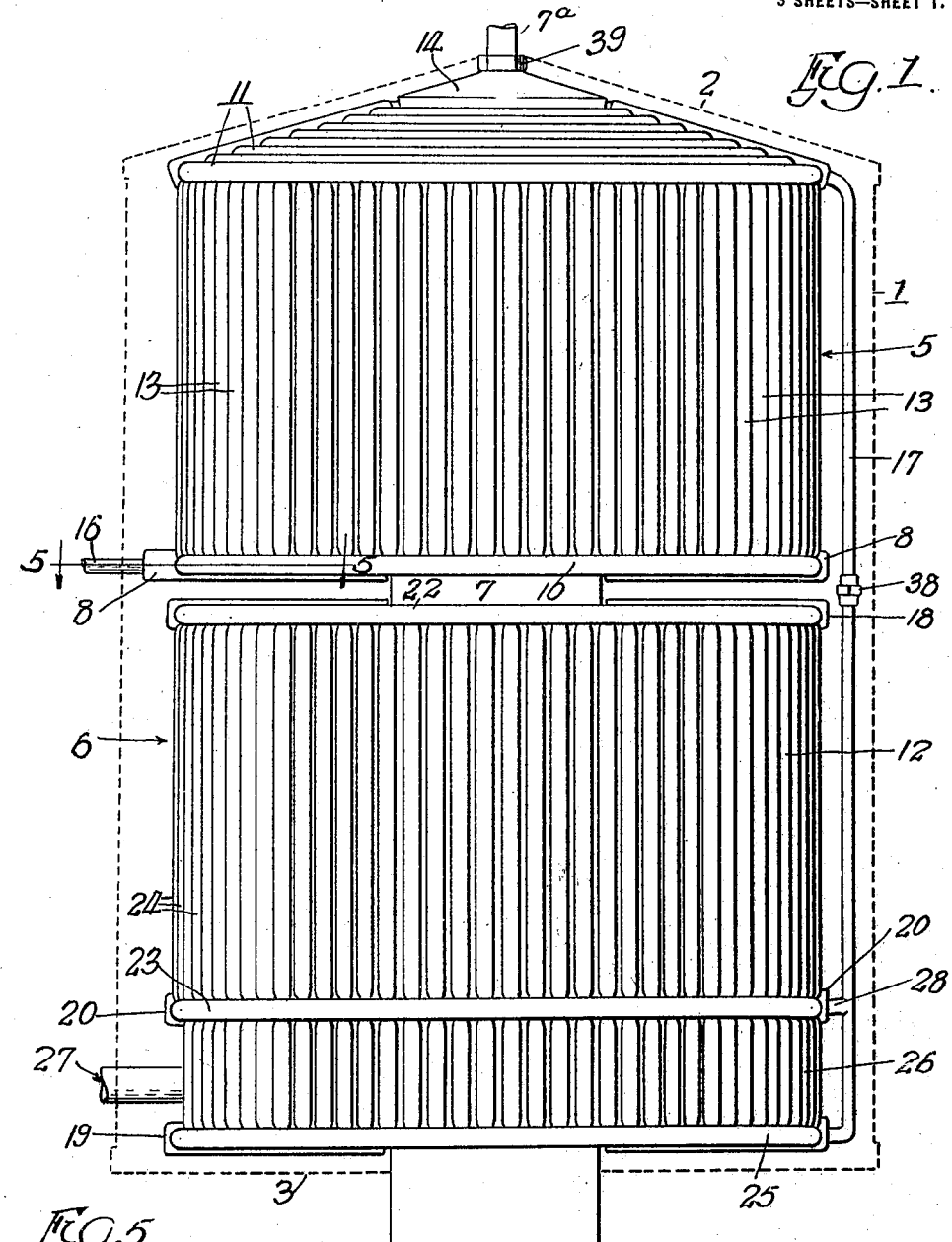
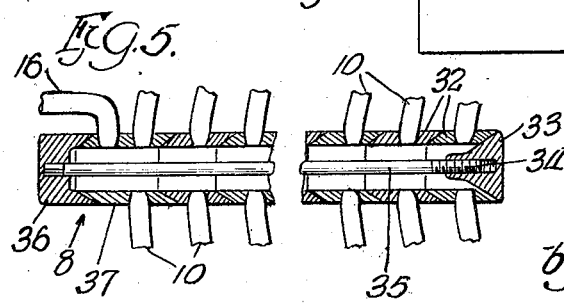
Inventor
Joseph T. Blakeman
by Eugene Curtain Atty.

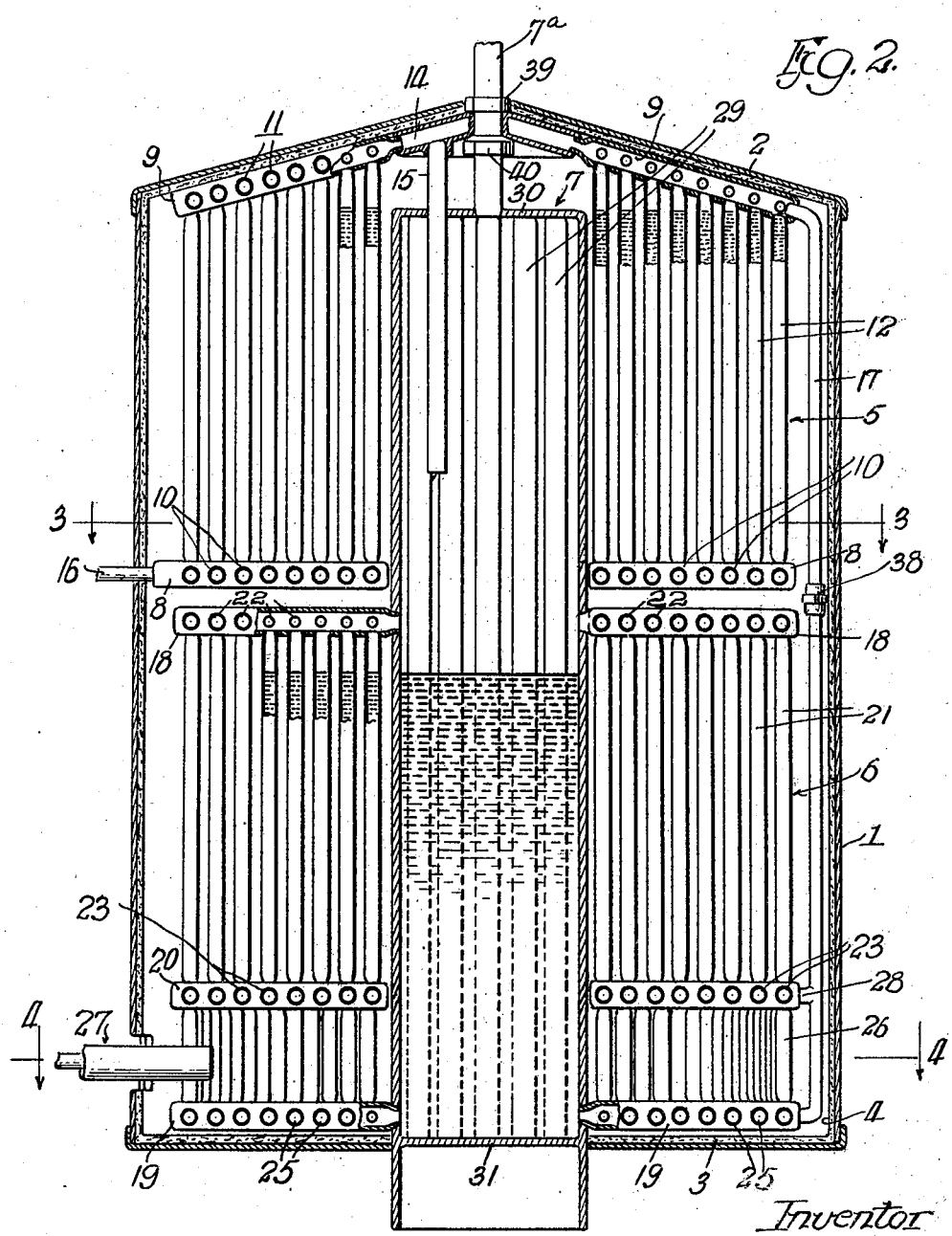

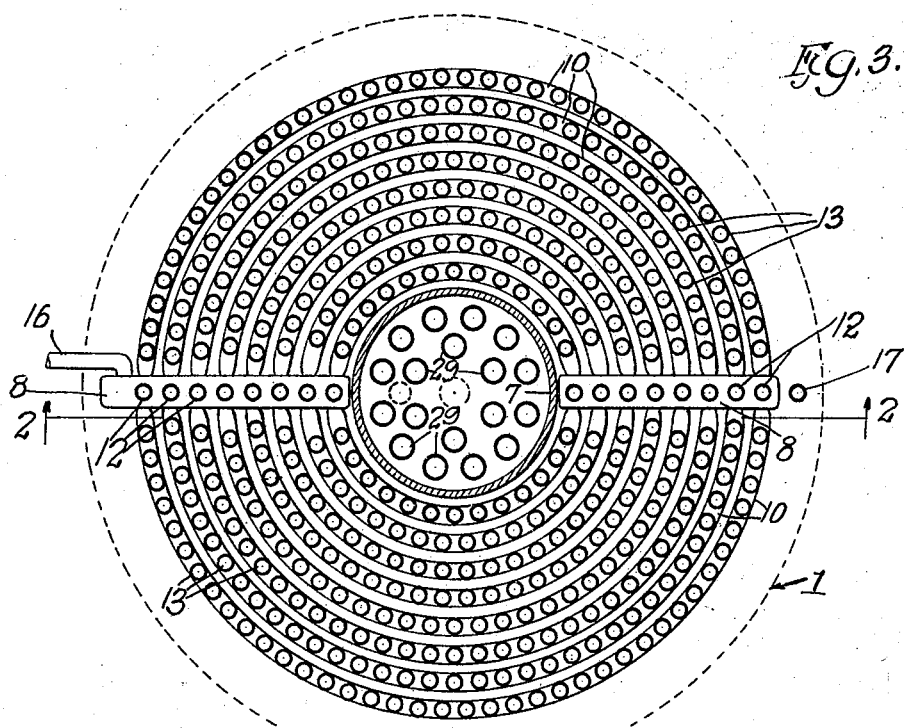
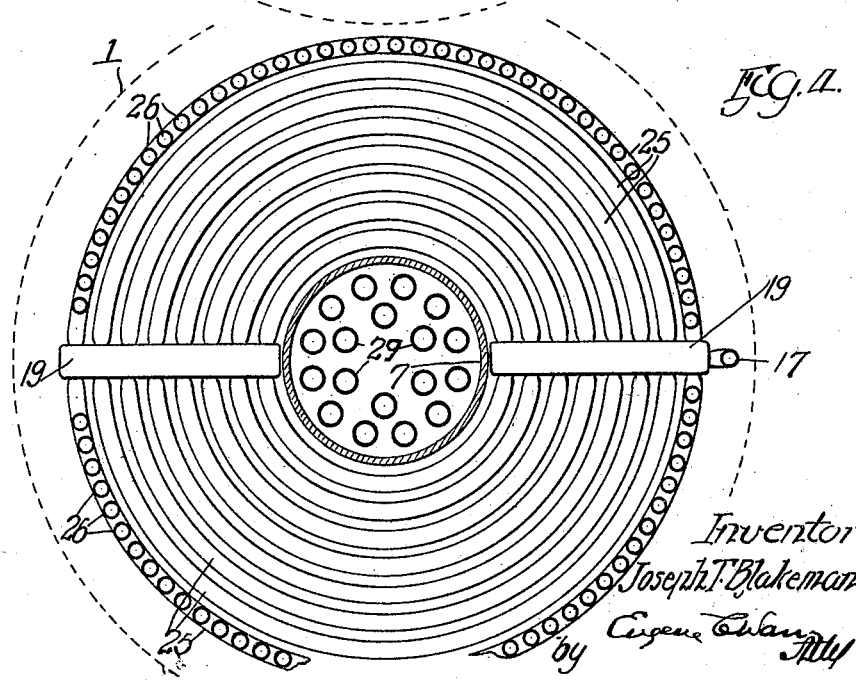

UNITED STATES PATENT OFFICE.

JOSEPH T. BLAKEMAN, OF RICHLAND CENTER, WISCONSIN.

STEAM-GENERATOR.

1,398,582.

Specification of Letters Patent.  Patented Nov. 29, 1921.

Application filed April 10, 1920. Serial No. 372,915.

*To all whom it may concern:*

Be it known that I, JOSEPH T. BLAKEMAN, a citizen of the United States, residing at Richland Center, in the county of Richland and State of Wisconsin, have invented new and useful Improvements in Steam-Generators, of which the following is a specification.

This invention relates to steam generators particularly adapted for steam driven road vehicles, of the pleasure as well as the commercial type, as for instance automobiles, trucks and tractors, and used for producing steam for operating the steam engines of such vehicles.

Among the objects of my invention is to provide an improved steam generator for such use, and more particularly one that is compact and relatively small in size so that it will occupy a minimum amount of space on the vehicle, yet have a maximum steaming capacity and also produce steam rapidly. This is accomplished by providing the generator with a plurality of water containing sections, all having a maximum amount of water exposed to the direct action of the heat provided in the generator, and all producing steam independently of each other, so that a relatively large steaming capacity is gained and the opportunity afforded for producing steam rapidly.

The invention consists further in the matters hereinafter described and more particularly pointed out in the appended claims.

In the accompanying drawings—

Figure 1 is a side elevational view of a steam generator construction in accordance with my invention, the outer casing being shown in dotted lines;

Fig. 2 is a vertical sectional view taken on line 2—2 of Fig. 3;

Figs. 3 and 4 are horizontal sectional views taken on lines 3—3 and 4—4, respectively, of Fig. 2; and Fig. 5 is an enlarged fragmentary sectional view of one of the headers, taken on line 5—5 of Fig. 1 and showing the sectional formation thereof to permit the generator to be readily taken down for cleansing or repair.

The steam generator of my invention is inclosed within a hollow casing having an upright surrounding wall 1, a top wall 2, and a bottom wall 3, the compartment thus formed being lined with a layer of asbestos or other refractory material 4 to retain as much heat as possible in the casing. The generator comprises a plurality of steam producing sections 5, 6, and 7, all supplied with water from the main supply tank on the vehicle, and the sections 5 and 6 having their steam chambers opening into the steam chamber of the section 7, from which steam is conveyed by a pipe to the place of use, as the cylinders of the engine. In the generator shown, the sections 5 and 6 are arranged one above the other and surround the section 7, which is in the form of an upright elongated tank, centrally disposed within the sections 5 and 6.

The upper section 5 has two lower headers 8, 8, arranged substantially horizontal, and extending radially outward from the tank 7, and diametrically disposed, as shown. This section also has two upper headers 9, 9, inclined upwardly toward each other and arranged in the same vertical plane as the lower headers, thus providing a lower and an upper header on opposite sides of the tank and in the same vertical plane. The lower headers 8, 8 are connected together by a plurality of horizontally arranged semi-circular pipes 10, 10. These surround the center section 7 and are arranged concentric thereto, as shown in Fig. 3. The upper headers 9, 9 are connected by a plurality of semicircular pipes 11, 11 arranged in the same manner, but as the headers 9, 9 are inclined upwardly, these pipes 11, 11 are stepped one above the other, as shown in Figs. 1 and 2. Each upper header 9 is connected with the lower header 8 directly therebelow by a plurality of vertically arranged pipes 12, and the semicircular pipes 10, 11 are connected together in like manner by a plurality of vertically arranged pipes 13. The upper ends of the headers 9, 9 are connected with and open into a circular header 14 above the center section 7, as shown. Steam generated in the upper section 5 is discharged into this header 14, and from the latter is delivered by a pipe 15 into the upper end of the center section 7, from which the steam is carried to the place of use by a pipe 7ᵃ. Water is supplied to the section 5 by a feed pipe 16 entering the casing 1 and connected with one of the lower headers 8, as shown. The lower headers 8, 8 being connected together by the semicircular pipes 10, 10, both headers and said pipes will be filled with water and the water will fill the upright pipes 12 and 13 to about the level shown in Fig. 2, that is, to a point where the water will reach the lower outer ends of the inclined headers 9, 9, because to one of these headers at its lower outer end is connected an overflow pipe 17, which supplies the lower section 6 with water from the upper one.

The lower section 6 has two upper headers 18, 18, two lower headers 19, 19, and two intermediate headers, 20, 20. These headers are all arranged substantially horizontal, extend radially outward from the mid-section 7, and are diametrically disposed like the headers in the upper section. The headers 18 and 20 are connected together by a plurality of vertically arranged pipes 21. The upper headers 18 are further connected together in a horizontal plane by a plurality of semicircular pipes 22, and the lower headers 19 are connected in a like manner by a plurality of semicircular pipes 23, being the same in number and arranged like the corresponding pipes in the upper section 5. The pipes 22, 23 are connected together by a plurality of vertically arranged pipes 24, like the corresponding ones in the section 5 above. The lowermost headers 19 are connected together in a horizontal plane by a plurality of semicircular pipes 25, arranged like the corresponding ones above and as shown in Fig. 4. None of these pipes, except the outside ones, are connected with the corresponding ones immediately above in order to provide a combustion chamber. The outside pipes 23, 25 are connected together by a plurality of vertically arranged pipes 26, which surround the combustion chamber so formed and are subjected to the heat produced in such chamber. These pipes may be protected by a shield in order to prevent them from steaming. A number of these pipes 26 are omitted at one side of the section 6, preferably at the headers 19 and 20, as shown, to provide an opening to permit the discharge end of a spray nozzle 27 of a liquid fuel generator to project a mixture of liquid fuel and air into the combustion chamber and give it a whirling motion in a substantially horizontal plane.

The lower section 6 is filled with water to about the water level shown in Fig. 2, and steam generated in the upper end of the section is discharged into the central section 7, by having the upper headers 18 open at their inner ends in said central section, as shown in Fig. 2. The overflow pipe 17 is connected by a branch 28 with one of the headers 20, while the lower end of said pipe 17 is connected with one of the headers 19, thus filling the lower section 6 with water from the upper section. To supply the center section 7 with water, the lowermost headers 19, 19 have their inner ends connected with and opening into the same, as shown, and thus the level of water in the mid-section 7 will be the same as in the section 6. The upper section 5 first fills with water to the level shown before the lower section 6 or the central section receive any water. As the upper section overflows, the other two sections are filled to the level noted and no farther for there is included in the feed mechanism an automatically actuated level regulator, not shown but of a type obtainable on the market. This device acts to keep the water in the lower section around the level shown, and consequently keeps the water in the upper section at its level.

When the combustible material supplied to the generator is ignited, the flame produced will extend up through the greater portion of the generator and envelop and be in contact with practically all of the pipes of the lower section and the portion of the center section containing water, and surround the pipes of the upper section for a greater portion of their length, thus having practically all of the water surface exposed to the flames and manifestly generate steam rapidly and to the maximum extent. By having a plurality of sections 5, 6 and 7 and all generating steam, the steaming capacity of the device is greatly increased, and thus is well adapted for use on road vehicles which are steam driven. Moreover, by having all of the pipes full of water at all times, no opportunity is afforded to burn out any pipes or create difficulty by allowing the pipes to steam at the wrong points. The generator is compact, occupying a minimum amount of space, yet has a large steaming capacity and for that reason is particularly applicable to steam driven vehicles, of the kind heretofore mentioned.

The products of combustion rise to the top of the casing 1, and pass out of the same through flues 29 extending through the center section 7. These flues open through the top and bottom walls 30, 31 of said center section 7, and as the heated gases pass down through the portion of the flues in the steam chamber of said section 7, the steam therein is dried, while as the heated gases pass through the remaining portions of the flues extending through the water in said section, the water is heated. Thus, the heated gases are used to the fullest extent possible before being discharged, and, furthermore, the body of water in the mid-section 7 is subjected to approximately as much heat as if it was carried in pipes as in the other two sections. The lower end of the section 7 extends beyond its bottom wall 31, as shown in Fig. 2, to discharge the waste gases below the casing and into the atmosphere below the vehicle, and, furthermore, to provide a depending part which may be engaged by means to clamp the generator to a support such as the chassis or frame of the vehicle on which it is mounted.

The generator is made sectional to be taken down for cleansing or repair. In Fig. 5, there is illustrated one of the headers 8 made sectional for this purpose, and it is to be understood that the other headers will be so made to provide a take-down structure. As shown, the header 8 is formed of a plurality of relatively short pipe sections or units 32 having their ends beveled and abutting, as shown in Fig. 5. Each unit has one of the vertical and horizontal pipes connected therewith. To clamp the units together, there is provided at the inner end of the header a plug 33, which closes that end of the header, and said plug is provided with a screw-threaded socket or recess 34 to receive the threaded end of a tie-rod 35, which extends through the header as shown. The opposite end of the rod 35 is secured to a plug or cap 36, which is turned to tighten the parts. The unit 37 at the outer end of the header is longer than any of the others to permit the feed water pipe 16 to be connected therewith. The other header 8 is so made but the end section 37 has no feed water pipe connected therewith. In the case of the headers 18 and 19 which open into the center section 7, the tie-rod extends through such section. The pipe 17, which extends between the upper and lower sections 5, 6, is made in two parts joined together by union 38. This permits the upper section to be uncoupled from the lower one, when it is desired to remove one from the other and still allow the lower one to remain in the casing 1. To support the sections in the casing, the steam supply pipe 7ª is threaded to receive two nuts 39, 40, clamped against the header 14 in the manner shown in Fig. 2.

While I have shown and described herein in detail a generator embodying the features of my invention, it is to be of course understood that the various details of construction and arrangement of parts may be variously changed and modified without departing from the spirit and scope of my invention.

I claim as my invention:

1. A steam generator of the character described, comprising an outer casing, a plurality of water containing sections located therein and all subjected directly to the heat produced in the casing, two of said sections arranged one above the other and surrounding a third section, each of said sections having a steam chamber, the steam chambers of upper and lower sections opening into the steam chamber of said third section, with the steam chamber of the lower section opening into the steam chamber of the third section below the upper section, and an outlet pipe for the steam produced by the generator opening into the steam chamber of said third section.

2. A steam generator of the character described, comprising an outer casing, a plurality of water containing sections located therein, two of said sections arranged one above the other and composed of a plurality of connected substantially horizontally and vertically arranged pipes, said two sections surrounding a third section formed of an elongated vertically arranged container, all of said sections producing steam independently of each other with the steam chambers of said sections communicating with each other, and an outlet pipe for the steam produced by the generator opening into one of the steam chambers.

3. A steam generator of the character described, comprising an outer casing, a plurality of water containing sections located therein and producing steam independently of each other, two of said sections being arranged one above the other and surrounding a third section, each of said sections having a steam chamber, the steam chambers of said sections communicating with each other, an outlet pipe for the steam produced by the generator and opening into one of the steam chambers, said sections having connection with each other so that water may be supplied to one through the other, and a feed water pipe connected with one of said sections.

4. A steam generator of the character described, comprising an outer casing, a plurality of water containing sections located therein and producing steam independently of each other, two of said sections being arranged one above the other and surrounding a third section, each of said sections having a steam chamber, the steam chambers of said sections communicating with each other, an outlet pipe for the steam opening into one of the steam chambers, said sections having connection with each other so that water may be supplied through the upper section to the other ones and be maintained at a predetermined level in each section, and a feed water pipe connected with the upper section.

5. A steam generator of the character described, comprising an outer casing, a plurality of water containing sections located therein and producing steam independently of each other, two of said sections arranged one above the other and each being composed of a plurality of sets of connected semicircular pipes substantially horizontally arranged and surrounding a third section in the form of an elongated vertically arranged tank, said sets of horizontally arranged pipes being connected by vertically arranged pipes extending between them, the steam chambers of said sections being at the upper ends thereof and communicating with each other, a supply pipe for the steam opening into the third section, a feed water pipe connected with the upper section at the lower end thereof for supplying water thereto, a pipe connecting the upper section with the lower section, and the latter being connected with the third section for supplying water to said sections from the upper section.

6. A steam generator of the character described, comprising an outer casing, a plurality of water containing sections located therein and producing steam independently of each other, two of said sections arranged one above the other and each being composed of an upper and a lower set of semicircular pipes substantially horizontally arranged and surrounding a third section in the form of an elongated vertically arranged tank, the semicircular pipes in each set being connected by headers communicating with the steam chamber of the third section, the headers and semicircular pipes of each section being connected by vertically arranged pipes, a feed water pipe connected with the upper section at the lower end thereof for filling the same, a pipe connected with the upper section at the line of the water level therein and opening at its lower end into the lower section for filling the same with water from the upper section, said lower section being connected with the third section for supplying the same with water, and a steam supply pipe opening into the steam chamber of said third section.

7. A steam generator of the character described, comprising an outer casing, a plurality of water containing sections located therein, two of said sections arranged one above the other and each composed of an upper and a lower set of semicircular pipes substantially horizontally arranged and connected by headers; the latter and the semicircular pipes of each section being connected by vertically arranged pipes, said upper section having the upper headers thereof inclined upwardly and opening into a circular header between the inner ends thereof, a steam supply pipe connected with said circular header and opening into the steam chamber of said third section, the upper headers of the lower section opening into the steam chamber of the third section below the upper section, means for supplying water to said sections through the upper section, and a steam pipe leading out of the steam chamber of said third section.

8. A steam generator of the character described, comprising a plurality of water containing sections located therein and producing steam independently of each other and having their steam chambers communicating with each other, a steam pipe leading from one of said chambers, two of said sections arranged one above the other and surrounding a third section composed of an elongated tank having a plurality of flues extending therethrough to carry the waste gas through the third section and discharge the steam below the generator, a feed water pipe connected with the upper section for supplying the same with water, a pipe connected with the upper section at the line of water level therein and opening into the lower section, and the latter connected with the third section so that water may be supplied to said sections through the upper section.

In testimony that I claim the foregoing as my invention, I affix my signature, this 3rd day of April, A. D., 1920.

JOSEPH T. BLAKEMAN.